(12) United States Patent
Safronov et al.

(10) Patent No.: US 11,194,878 B2
(45) Date of Patent: Dec. 7, 2021

(54) METHOD OF AND SYSTEM FOR GENERATING FEATURE FOR RANKING DOCUMENT

(71) Applicant: YANDEX EUROPE AG, Lucerne (CH)

(72) Inventors: Aleksandr Valerievich Safronov, Moscow (RU); Vasily Vladimirovich Zavyalov, Tyumen (RU)

(73) Assignee: YANDEX EUROPE AG, Lucerne (CH)

( * ) Notice: Subject to any disclaimer, the term of this patent is extended or adjusted under 35 U.S.C. 154(b) by 233 days.

(21) Appl. No.: 16/571,870

(22) Filed: Sep. 16, 2019

(65) Prior Publication Data
US 2020/0192961 A1 Jun. 18, 2020

(30) Foreign Application Priority Data

Dec. 13, 2018 (RU) .......................... RU2018144177

(51) Int. Cl.
*G06F 16/00* (2019.01)
*G06F 16/9538* (2019.01)
(Continued)

(52) U.S. Cl.
CPC ...... *G06F 16/9538* (2019.01); *G06F 16/9532* (2019.01); *G06F 16/9536* (2019.01); (Continued)

(58) Field of Classification Search
CPC ............. G06F 16/9538; G06F 16/9532; G06F 16/9536; G06F 16/3349; G06F 16/248; (Continued)

(56) References Cited

U.S. PATENT DOCUMENTS 6,185,558 B1 2/2001 Bowman et al.
6,189,002 B1 2/2001 Roitblat
(Continued)

FOREIGN PATENT DOCUMENTS

CN 106095983 A 11/2016
JP 2008181186 A 8/2008
(Continued)

OTHER PUBLICATIONS

Eugene Opoku-Mensah et al., "Understanding User Situational Relevance in Ranking Web Search Results", IEEE, pp. 405-410 (Year: 2017).*
(Continued)

*Primary Examiner* — Jared M Bibbee
(74) *Attorney, Agent, or Firm* — BCF LLP

(57) ABSTRACT

A method and a system for ranking a document in response to a query, the document having no value for a given feature with respect to the query. A set of documents relevant to the query is generated. The document is selected, and a set of past queries having presented the document as a search result are retrieved. Respective values for the given feature for the document with respect to the set of past queries are retrieved. A respective similarity parameter is determined between the query and each of the set of past queries. The value of the given feature for the document is generated based at least in part on the respective similarity parameter and the respective value for the given feature of at least one past query. The set of documents including the document is ranked based in part on the given feature.

14 Claims, 7 Drawing Sheets

(51) Int. Cl.
*G06N 20/00* (2019.01)
*G06F 16/9532* (2019.01)
*G06K 9/62* (2006.01)
*G06F 16/9536* (2019.01)

(52) U.S. Cl.
CPC ........... *G06K 9/623* (2013.01); *G06K 9/6256* (2013.01); *G06N 20/00* (2019.01)

(58) Field of Classification Search
CPC .......... G06N 20/00; G06N 5/04; G06N 20/20; G06N 5/003; G06N 3/08; G06K 9/6256; G06K 9/623; G06K 9/00442
See application file for complete search history.

(56) References Cited

U.S. PATENT DOCUMENTS

| | | |
|---|---|---|
| 6,269,368 B1 | 7/2001 | Diamond |
| 6,701,311 B2 | 3/2004 | Biebesheimer et al. |
| 6,738,764 B2 | 5/2004 | Mao et al. |
| 7,523,105 B2 | 4/2009 | Wen et al. |
| 7,577,643 B2 | 8/2009 | Dominowska et al. |
| 7,603,348 B2 | 10/2009 | He et al. |
| 7,689,585 B2 | 3/2010 | Zeng et al. |
| 7,877,385 B2 | 1/2011 | Craswell et al. |
| 7,877,404 B2 | 1/2011 | Achan et al. |
| 7,895,235 B2 | 2/2011 | Baeza-Yates et al. |
| 7,921,119 B2 | 4/2011 | Bowman et al. |
| 7,958,115 B2 | 6/2011 | Kraft |
| 7,958,158 B2 | 6/2011 | Bestgen et al. |
| 8,086,619 B2 | 12/2011 | Haahr et al. |
| 8,135,698 B2 | 3/2012 | Dettinger et al. |
| 8,145,623 B1 | 3/2012 | Mehta et al. |
| 8,156,129 B2 | 4/2012 | Zhou et al. |
| 8,214,363 B2 | 7/2012 | Chaudhary |
| 8,239,334 B2 | 8/2012 | Yan et al. |
| 8,239,370 B2 | 8/2012 | Wong et al. |
| 8,321,448 B2 | 11/2012 | Zeng et al. |
| 8,359,282 B2 | 1/2013 | Bai et al. |
| 8,392,436 B2 | 3/2013 | Bai et al. |
| 8,423,547 B2 | 4/2013 | Liu et al. |
| 8,452,758 B2 | 5/2013 | Tong et al. |
| 8,463,595 B1 | 6/2013 | Rehling et al. |
| 8,533,130 B2 | 9/2013 | Ershov |
| 8,543,668 B1 | 9/2013 | Long |
| 8,606,786 B2 | 12/2013 | Rounthwaite et al. |
| 8,612,367 B2 | 12/2013 | Xu et al. |
| 8,626,758 B2 | 1/2014 | Alspector et al. |
| 8,645,390 B1 | 2/2014 | Oztekin et al. |
| 8,655,868 B2 | 2/2014 | Parikh et al. |
| 8,655,872 B2 | 2/2014 | Kraft |
| 8,719,257 B2 | 5/2014 | Rangan |
| 8,775,442 B2 | 7/2014 | Moore et al. |
| 8,788,477 B1 | 7/2014 | Jung et al. |
| 8,898,156 B2 | 11/2014 | Xu et al. |
| 9,009,146 B1* | 4/2015 | Lopatenko .......... G06F 16/9535 707/723 |
| 9,009,148 B2 | 4/2015 | Gao et al. |
| 9,064,007 B1 | 6/2015 | Jacobsson et al. |
| 9,098,571 B2 | 8/2015 | Achuthan et al. |
| 9,104,733 B2 | 8/2015 | Gao et al. |
| 9,183,323 B1 | 11/2015 | Shaw |
| 9,251,292 B2 | 2/2016 | Cheng et al. |
| 9,400,838 B2 | 7/2016 | Musgrove et al. |
| 9,477,654 B2 | 10/2016 | He et al. |
| 9,507,861 B2 | 11/2016 | Ali et al. |
| 9,519,859 B2 | 12/2016 | Huang et al. |
| 9,535,960 B2 | 1/2017 | Guo et al. |
| 9,633,017 B2 | 4/2017 | Yi et al. |
| 9,659,248 B1 | 5/2017 | Barbosa et al. |
| 9,715,660 B2 | 7/2017 | Parada et al. |
| 9,720,904 B2 | 8/2017 | Ikawa et al. |
| 9,767,182 B1 | 9/2017 | Thakur et al. |
| 9,773,256 B1 | 9/2017 | Frumkin et al. |
| 9,898,554 B2 | 2/2018 | Gupta et al. |
| 10,089,580 B2 | 10/2018 | Shan et al. |
| 10,915,524 B1 | 2/2021 | Gupta et al. |
| 2004/0249808 A1 | 12/2004 | Azzam et al. |
| 2006/0136411 A1* | 6/2006 | Meyerzon ........... G06F 16/3344 |
| 2006/0149710 A1 | 7/2006 | Koningstein et al. |
| 2007/0005587 A1* | 1/2007 | Johnson ............. G06F 16/9535 |
| 2007/0061333 A1 | 3/2007 | Ramer et al. |
| 2007/0150466 A1 | 6/2007 | Brave et al. |
| 2008/0109285 A1 | 5/2008 | Reuther et al. |
| 2008/0114750 A1 | 5/2008 | Saxena et al. |
| 2009/0063460 A1 | 3/2009 | Selberg |
| 2009/0234711 A1 | 9/2009 | Ramer et al. |
| 2009/0313286 A1 | 12/2009 | Mishra et al. |
| 2010/0010895 A1 | 1/2010 | Gabrilovich et al. |
| 2010/0082582 A1 | 4/2010 | Gao et al. |
| 2010/0185649 A1 | 7/2010 | Zhou et al. |
| 2010/0198816 A1 | 8/2010 | Kwan |
| 2010/0312764 A1* | 12/2010 | Liao ..................... G06F 16/338 707/723 |
| 2010/0332493 A1 | 12/2010 | Haas et al. |
| 2011/0238662 A1 | 9/2011 | Shuster et al. |
| 2011/0264651 A1 | 10/2011 | Selvaraj et al. |
| 2012/0143790 A1 | 6/2012 | Wang et al. |
| 2012/0253792 A1 | 10/2012 | Bespalov et al. |
| 2013/0110824 A1 | 5/2013 | Derose et al. |
| 2015/0248454 A1 | 9/2015 | Muraoka et al. |
| 2015/0262077 A1 | 9/2015 | White et al. |
| 2015/0347519 A1 | 12/2015 | Hornkvist et al. |
| 2015/0356199 A1 | 12/2015 | Mei et al. |
| 2015/0363688 A1 | 12/2015 | Gao et al. |
| 2016/0299899 A1 | 10/2016 | Logachev |
| 2016/0321321 A1 | 11/2016 | Huang |
| 2016/0321367 A1* | 11/2016 | Arya .................. G06F 16/9535 |
| 2017/0011289 A1 | 1/2017 | Gao et al. |
| 2017/0060844 A1* | 3/2017 | He ......................... G06F 40/30 |
| 2017/0060993 A1 | 3/2017 | Pendar et al. |
| 2017/0124447 A1 | 5/2017 | Chang et al. |
| 2017/0286835 A1 | 10/2017 | Ho et al. |
| 2017/0344555 A1 | 11/2017 | Yan et al. |
| 2018/0032897 A1 | 2/2018 | Cao et al. |
| 2018/0052853 A1* | 2/2018 | Rickard, Jr. ........ G06F 16/9535 |
| 2018/0121550 A1 | 5/2018 | Jeon et al. |
| 2018/0150466 A1* | 5/2018 | Paquet .............. G06F 16/24578 |
| 2019/0205472 A1* | 7/2019 | Kulkarni ............. G06F 3/04812 |
| 2019/0340256 A1* | 11/2019 | Kulkarni ............. G06F 16/9535 |

FOREIGN PATENT DOCUMENTS

| | | |
|---|---|---|
| KR | 20100069118 A | 6/2010 |
| RU | 2556425 C1 | 7/2015 |
| RU | 2609079 C2 | 1/2017 |
| RU | 2632143 C1 | 10/2017 |
| RU | 2637998 C1 | 12/2017 |
| RU | 2643466 C1 | 2/2018 |

OTHER PUBLICATIONS

Yongjian Liu et al., "The Research of Optimizing Page Ranking Based on User's Feature", IEEE, pp. 1950-1952 (Year: 2012).*
Office Action with regard to the counterpart U.S. Appl. No. 16/190,441 dated Oct. 21, 2020.
Search Report with regard the counterpart RU Patent Application No. 2018144177 completed May 21, 2020.
Office Action with regard to the counterpart U.S. Appl. No. 16/190,441 dated Jun. 11, 2020.
Search Report with regard to the RU counterpart patent application No. 2017146890 completed Dec. 13, 2019.
Search Report with regard to the RU counterpart patent application No. 2018122689 completed Jan. 28, 2020.
English Abstract for JP2008181186 retrieved on Espacenet on May 3, 2018.
English Abstract for KR20100069118 retrieved on Espacenet on May 3, 2018.
Huang et al., "Learning Deep Structured Semantic Models for Web Search using Clickthrough Data", CIKM'13, 2013, USA, 8 pages.
Wen et al., "Query Clustering Using User Logs", ACM Transactions on Information Systems, vol. 20, No. 1, 2002, pp. 69-81.

(56) References Cited

OTHER PUBLICATIONS

Wen et al., "Clustering User Queries of a Search Engine", WWW10, 2001, Hong Kong, 14 pages, http://wwwconference.org/www10/cdrom/papers/368/index.html.

Beeferman et al., "Agglomerative clustering of a search engine query log", Agglomerative clustering of a search engine query log, 2000, USA, 10 pages.

"DSSM", Microsoft Research, 2015, 4 pages, https://www.microsoft.com/en-us/research/project/dssm/.

English Abstract for CN106095983 retrieved on Espacenet on May 9, 2018.

McCreadie et al., "A Study of Personalised Medical Literature Search", In: Kanoulas E. et al. (eds) Information Access Evaluation. Multilinguality, Multimodality, and Interaction. CLEF 2014. Lecture Notes in Computer Science, vol. 8685. Springer, Cham. https://doi.org/10.1007/978-3-319-11382-1_8, Abstract, 7 pages.

Gao et al., "Clickthrough-Based Translation Models for Web Search: from Word Models to Phrase Models", CIKM'10, Oct. 26-29, 2010, Toronto, Ontario, Canada, 10 pages.

Gao et al., "Clickthrough-Based Latent Semantic Models for Web Search", SIGIR'11, Jul. 24-28, 2011, Beijing, P. R. China, 10 pages.

Office Action with regard to the U.S. Appl. No. 16/387,679 dated May 12, 2021.

Notice of Allowance with regard to the U.S. Appl. No. 16/387,679 dated Jul. 21, 2021.

Baeza-Yates, "Graphs from Search Engine Queries", International Conference on Current Trends in Theory and Practice of Computer Science, SOFSEM 2007: Theory and Practice of Computer Science, https://link.springer.com/chapter/10.1007/978-3-540-69507-3_1, Abstract, 4 pages.

\* cited by examiner

METHOD OF AND SYSTEM FOR GENERATING FEATURE FOR RANKING DOCUMENT

CROSS-REFERENCE

The present application claims priority to Russian Patent Application No. 2018144177, filed Dec. 13, 2018, entitled "METHOD OF AND SYSTEM FOR GENERATING FEATURE FOR RANKING DOCUMENT", the entirety of which is incorporated herein.

FIELD

The present technology relates to information retrieval in general, and more specifically, to a method of and a system for generating a feature for ranking at least one document in response to a query.

BACKGROUND

Machine learning algorithms (MLAs) are used to address multiple needs in computer-implemented technologies. Typically, the MLAs are used for generating a prediction associated with a user interaction with a computer device. One example of an area where such prediction is required is user interaction with the content available on the Internet (as an example).

The volume of available information through various Internet resources has grown exponentially in the past couple of years. Several solutions have been developed in order to allow a typical user to find the information that the user is looking for. One example of such a solution is a search engine. Examples of the search engines include GOOGLE™ search engine, YANDEX™ search engine, YAHOO!™ search engine and the like. The user can access the search engine interface and submit a search query associated with the information that the user is desirous of locating on the Internet. In response to the search query, the search engine provides a ranked list of search results. The ranked list of search results is generated based on various ranking algorithms employed by the particular search engine that is being used by the user performing the search. The overall goal of such ranking algorithms is to present the most relevant search results at the top of the ranked list, while less relevant search results would be positioned on less prominent positions of the ranked list of search results (with the least relevant search results being located towards the bottom of the ranked list of search results).

The search engines typically provide a good search tool for a search query that the user knows apriori that she/he wants to search. In other words, if the user is interested in obtaining information about the most popular destinations in Italy (i.e. a known search topic), the user could submit a search query: "The most popular destinations in Italy?" The search engine will then present a ranked list of Internet resources that are potentially relevant to the search query. The user can then browse the ranked list of search results in order to obtain information she/he is interested in as it related to places to visit in Italy. If the user, for whatever reason, is not satisfied with the uncovered search results, the user can re-run the search, for example, with a more focused search query, such as "The most popular destinations in Italy in the summer?", "The most popular destinations in the South of Italy?", "The most popular destinations for a romantic getaway in Italy?".

In the search engine example, the MLA is used for generating the ranked search results. When the user submits a search query, the search engine generates a list of relevant web resources (based on an analysis of crawled web resources, an indication of which is stored in a crawler database in a form of posting lists or the like). The search engine then executes the MLA to rank the so-generated list of search results. The MLA ranks the list of search results based on their relevancy to the search query. Such the MLA is "trained" to predict relevancy of the given search result to the search query based on a plethora of "features" associated with the given search result, as well as indications of past users' interactions with search results when submitting similar search queries in the past.

U.S. Pat. No. 9,009,146 B1 granted on Apr. 14, 2014 to Google LLC and titled "Ranking search results based on similar queries" teaches a computer-implemented method for providing input to a document ranking process for ranking a plurality of documents, the document ranking process taking as input a quality of result statistic for an individual document in the plurality of documents, the plurality of documents having been identified in response to a query, the quality of results statistic being for the query and the individual document. The method for providing input can include, for a first document identified as a search result of a user-submitted query, scoring one or more other queries based upon a similarity to the user-submitted query, each of the one or more other queries being different from the user-submitted query.

U.S. Pat. No. 8,452,758 B2 granted on May 28, 2013 to Google LLC. and titled "Methods and systems for improving a search ranking using related queries" teaches systems and methods that improve search rankings for a search query by using data associated with queries related to the search query. In one aspect, a search query is received, a related query related to the search query is determined, an article (such as a web page) associated with the search query is determined, and a ranking score for the article based at least in part on data associated with the related query is determined. Several algorithms and types of data associated with related queries useful in carrying out such systems and methods are described.

U.S. Pat. No. 6,185,558 B1 granted on Feb. 6, 2001 to Amazon.com Inc and titled "Identifying the items most relevant to a current query based on items selected in connection with similar queries" teaches a software facility for identifying the items most relevant to a current query based on items selected in connection with similar queries. In preferred embodiments of the invention, the facility receives a query specifying one or more query terms. In response, the facility generates a query result identifying a plurality of items that satisfy the query. The facility then produces a ranking value for at least a portion of the items identified in the query result by combining the relative frequencies with which users selected that item from the query results generated from queries specifying each of the terms specified by the query. The facility identifies as most relevant those items having the highest ranking values.

SUMMARY

It is an object of the present technology to ameliorate at least some of the inconveniences present in the prior art. Embodiments of the present technology may provide and/or broaden the scope of approaches to and/or methods of achieving the aims and objects of the present technology.

Developer(s) of the present technology have appreciated at least one technical problem associated with the prior art approaches.

Developer(s) have acknowledged that considering user-centric factors, such as past user interactions with documents, for ranking documents in response to a given query, improves quality of a ranking. Generally speaking, a quality of a ranking may, inter alia, be evaluated by tracking user interactions with the documents provided in response to the given query, which have been originally ranked based on their relevance to the given query. Thus, a higher ranked document in a SERP should receive more interactions from users (e.g. clicks) than a lower ranked document, due to its higher relevancy to the given query, as predicted by the search engine server. However, since a variety of factors influence ranking of the documents, this may not be so in every case. Consequently, a MLA used by the search engine server may be "adjusted" such that lower ranked documents receiving more user interactions than higher ranked documents are "promoted" in future rankings, and such a procedure may be repeated at predetermined intervals of time to take into account changes in user interactions. Further, a MLA may also be trained to predict future user interactions for a document having a lack thereof based on other features of the query and/or the document.

Developer(s) of the present technology have also acknowledged that in some situations, a document in a set of documents may lack values for one or more given features, for example because an MLA could not generate the values for the one or more given features due to insufficient information. Consequently, this may prevent the ranking MLA from ranking the one or more documents, or ranking the one or more documents as well as it could due to this very lack of values for the one or more given features.

Thus, developer(s) have theorized that a document relevant to a given query lacking values for one or more given features, may have such values for the one or more given features for other queries for which the document was presented in response to. Developer(s) have also appreciated that a degree of similarity between the one or more other queries and the given query may be quantified, and such information could be used at least in part to generate to the lacking values for the one or more given features in response to the given query.

Thus, embodiments of the present technology are directed to a method of and a system for generating a feature for ranking a document.

Such an approach may provide the user with more satisfactory answers, which minimizes a need for a user to browse several SERPs or resubmitting queries for finding the information he or she is looking for, which in turn may save computational resources on both the client device associated with the user, and the search engine server.

In accordance with first broad aspect of the present technology, there is provided a computer-implemented method for ranking at least one document in response to a given query using a machine learning algorithm (MLA) executed by a server, the method executable by the server, the server is connected to a search log database. The given query is received and a set of documents relevant to the given query is generated, where the set of documents has a plurality of features. At least one document is selected from the set of documents, the at least one document having no respective value for a given feature of the plurality of features. A set of past queries having been submitted on the server is retrieved from the search log database, where each past query of the set of past queries has presented the at least one document as a respective search result in a respective search engine results page (SERP). For each respective past query, a respective value of the given feature for the at least one document is retrieved from the search log database. A respective similarity parameter between the given query and each respective past query of the set of past queries is determined. The respective value of the given feature for the at least one document is generated based at least in part on: the respective similarity parameter of at least one past query of the set of past queries, and the respective value for the given feature of the at least one past query of the set of past queries. The MLA ranks the set of documents to obtain ranked list of documents, where the ranking is based on the plurality of features, and where the at least one given document is ranked based at least in part on the respective value of the given feature, and the ranked list of documents to be presented as a SERP is transmitted to the electronic device.

In some embodiments of the method, each respective document of the set of documents relevant to the given query has a respective annotation, where the respective annotation includes: at least one respective past search query having been used to access the respective document on the search engine server. The set of past queries is retrieved based on the respective annotation of the at least one document.

In some embodiments of the method, the method further comprises, prior to the determining the respective similarity parameter: retrieving, from the search log database, a respective set of past documents for each respective past query of the set of past queries, the respective set of past documents having been presented as respective search results in response to the respective past query. The respective similarity parameter between the given query and each respective past query of the set of past queries is determined based on: the set of documents relevant to the given query, and the respective set of documents of the respective past query.

In some embodiments of the method, at least a subset of the set of documents is associated with respective user interaction parameters, and each respective document of the respective set of past documents for each respective query is associated with respective past user interaction parameters. The respective similarity parameter is determined further based on: the respective user interaction parameters of the respective query of the subset of documents, and the respective user interaction parameters of the respective set of past documents.

In some embodiments of the method, the server executes a second MLA, the second MLA having been trained to determine a similarity parameter between queries based on a textual content thereof. The respective similarity parameter is determined by the second MLA.

In some embodiments of the method, the method further comprises during a training phase: retrieving from the search log database, a plurality of search queries having been submitted on a search engine server, where each of the plurality of search queries is associated with a respective set of search results, and where each respective search result of the respective set of search results is associated with at least one respective user interaction parameter. For each query of the plurality of search queries, a respective query vector is generated based on the at least one respective user interaction parameter associated with each search result of the respective set of search results. For each possible pair of queries within the plurality of search queries, based on the respective query vectors of each query of the pair of queries, a respective similarity parameter is generated, where the respective similarity parameter is indicative of a degree of similarity between queries in the pair of queries. A set of training objects is generated, where each training object of the set of training objects includes an indication of a respective one of each of the possible pair of queries and the respective similarity parameter. The second MLA is trained on the set of training objects to determine a similarity parameter of a new pair of queries based on a textual content of each of the new pair of queries, where at least one query of the new pair of queries is not included in the set of training objects.

In some embodiments of the method, the method further comprises, prior to the generating the respective value of the given feature: selecting the at least one respective past query based on the respective similarity parameter is above a predetermined threshold.

In some embodiments of the method, the retrieving the respective value of the given feature of the at least one document for each respective past query further comprises: retrieving a respective relevance score of the at least one document to the respective past query. The respective value of the given feature is generated further based on the respective relevance score.

In some embodiments of the method, the generating the respective value of the given feature for the at least one document is further based on: a respective value of at least one other feature of the plurality of features for the given document.

In some embodiments of the method, the given feature is one of: a query-dependent feature, and a user interaction parameter.

In accordance with a second broad aspect of the present technology, there is provided a system for ranking at least one document in response to a given query using a machine learning algorithm (MLA) executed by the system, where the system is connected to a search log database, the system is connected to an electronic device. The system comprising: a processor, a non-transitory computer-readable medium comprising instructions, where the processor, upon executing the instructions, is configured to: receive the given query, and generate a set of documents relevant to the given query, where the set of documents has a plurality of features. The processor is configured to select the at least one document from the set of documents, the at least one document having no respective value for a given feature of the plurality of features. The processor is configured to retrieve, from the search log database, a set of past queries having been submitted on the server, each past query of the set of past queries having presented the at least one document as a respective search result in a respective search engine results page (SERP). The processor is configured to retrieve from the search log database, for each respective past query, a respective value of the given feature for the at least one document, and determine a respective similarity parameter between the given query and each respective past query of the set of past queries. The processor is configured to generate the respective value of the given feature for the at least one document based at least in part on: the respective similarity parameter of at least one past query of the set of past queries, and the respective value for the given feature of the at least one past query of the set of past queries. The processor is configured to cause the MLA to rank the set of documents to obtain ranked list of documents, the ranking is based on the plurality of features, the at least one given document is ranked based at least in part on the respective value of the given feature, and transmit, to the electronic device, the ranked list of documents to be presented as a SERP.

In some embodiments of the system, each respective document of the set of documents relevant to the given query has a respective annotation, where the respective annotation includes: at least one respective past search query having been used to access the respective document on the search engine server. The set of past queries is retrieved based on the respective annotation of the at least one document.

In some embodiments of the system, the processor is further configured to, prior to the determining the respective similarity parameter: retrieve, from the search log database, a respective set of past documents for each respective past query of the set of past queries, the respective set of past documents having been presented as respective search results in response to the respective past query. The processor is configured to determine the respective similarity parameter between the given query and each respective past query of the set of past queries based on: the set of documents relevant to the given query, and the respective set of documents of the respective past query.

In some embodiments of the system, at least a subset of the set of documents is associated with respective user interaction parameters, and each respective document of the respective set of past documents for each respective query is associated with respective past user interaction parameters. The respective similarity parameter is determined further based on: the respective user interaction parameters of the respective query of the subset of documents, and the respective user interaction parameters of the respective set of past documents.

In some embodiments of the system, the system executes a second MLA, where the second MLA has been trained to determine a similarity parameter between queries based on a textual content thereof. the respective similarity parameter is determined by the second MLA.

In some embodiments of the system, the processor is further configured to, during a training phase: retrieve from the search log database, a plurality of search queries having been submitted on a search engine server, where each of the plurality of search queries is associated with a respective set of search results, and where each respective search result of the respective set of search results is associated with at least one respective user interaction parameter. For each query of the plurality of search queries, a respective query vector is generated based on the at least one respective user interaction parameter associated with each search result of the respective set of search results. For each possible pair of queries within the plurality of search queries, based on the respective query vectors of each query of the pair of queries, a respective similarity parameter is generated, where the respective similarity parameter is indicative of a degree of similarity between queries in the pair of queries. A set of training objects is generated, where each training object of the set of training objects includes an indication of a respective one of each of the possible pair of queries and the respective similarity parameter. The second MLA is trained on the set of training objects to determine a similarity parameter of a new pair of queries based on a textual content of each of the new pair of queries, where at least one query of the new pair of queries is not included in the set of training objects.

In some embodiments of the system, the processor is further configured to, prior to the generating the respective value of the given feature: select the at least one respective past query based on the respective similarity parameter is above a predetermined threshold.

In some embodiments of the system, to retrieve the respective value of the given feature of the at least one document for each respective past query, the processor is further configured to: retrieve a respective relevance score of the at least one document to the respective past query, and the respective value of the given feature is generated further based on the respective relevance score.

In some embodiments of the system, the generating the respective value of the given feature for the at least one document is further based on: a respective value of at least one other feature of the plurality of features for the given document.

In some embodiments of the system, the given feature is one of: a query-dependent feature, and a user interaction parameter.

In the context of the present specification, a "server" is a computer program that is running on appropriate hardware and is capable of receiving requests (e.g. from electronic devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "electronic device" is any computer hardware that is capable of running software appropriate to the relevant task at hand. Thus, some (non-limiting) examples of electronic devices include personal computers (desktops, laptops, netbooks, etc.), smartphones, and tablets, as well as network equipment such as routers, switches, and gateways. It should be noted that a device acting as an electronic device in the present context is not precluded from acting as a server to other electronic devices. The use of the expression "an electronic device" does not preclude multiple electronic devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a document could include the document itself (i.e. its contents), or it could be a unique document descriptor identifying a file with respect to a particular file system, or some other means of directing the recipient of the indication to a network location, memory address, database table, or other location where the file may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
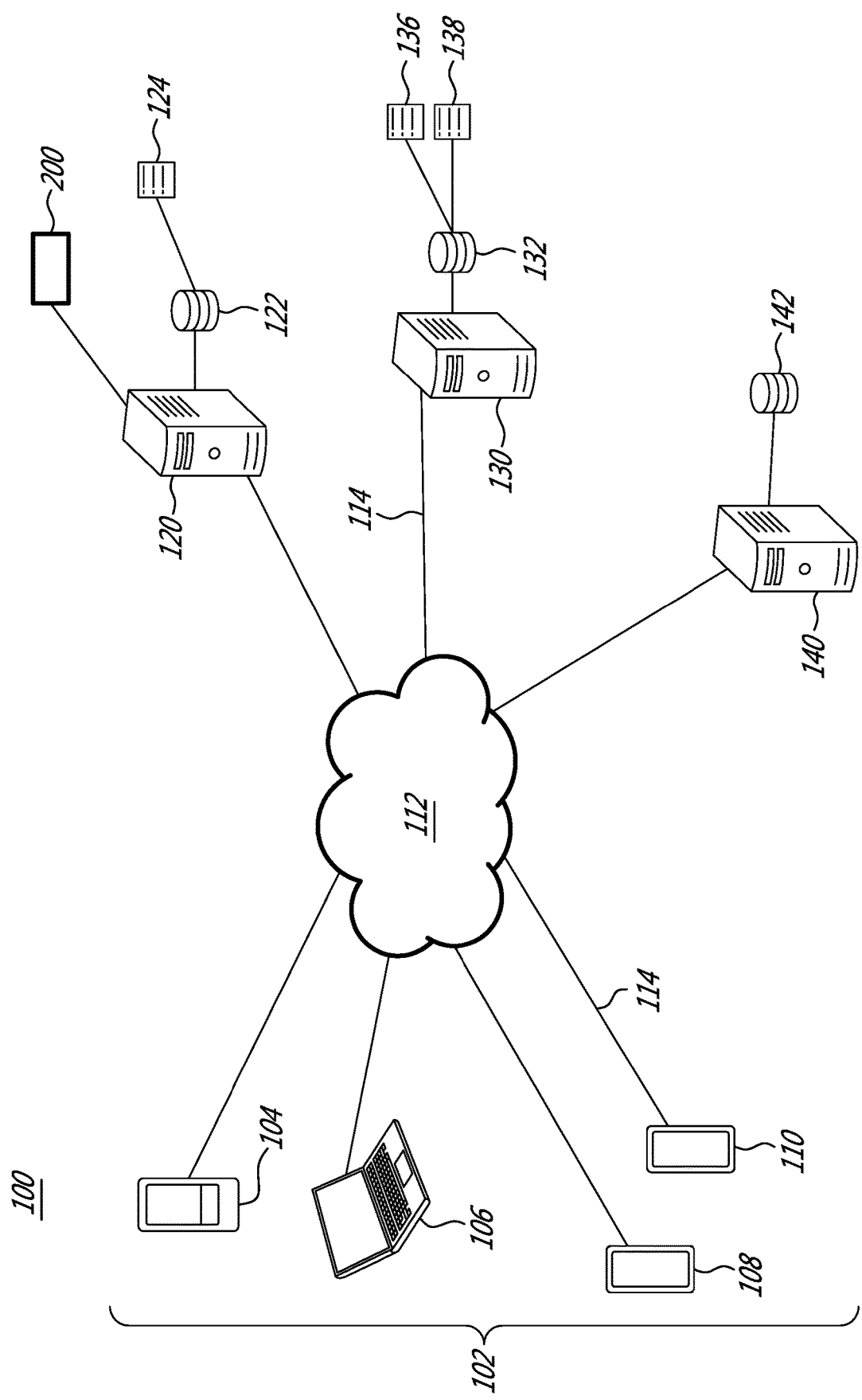
FIG. 1 depicts a diagram of a system implemented in accordance with non-limiting embodiments of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "processor" or a "graphics processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

With reference to FIG. 1, there is depicted a system 100, the system 100 implemented according to non-limiting embodiments of the present technology. The system 100 comprises a plurality of client devices 102, the plurality of client devices 102 including a first client device 104, a second client device 106, a third client device 108, and a fourth client device 110 coupled to a communication network 112 via a respective communication link 114 (only one numbered in FIG. 1). The system 100 comprises a search engine server 120, a tracking server 130 and a training server 140 coupled to the communication network 112 via their respective communication link 114.

As an example only, the first client device 104 may be implemented as a smartphone, the second client device 106 may be implemented as a laptop, the third client device 108 may be implemented as a smartphone and the fourth client device 110 may be implemented as a tablet. In some non-limiting embodiments of the present technology, the communication network 112 can be implemented as the Internet. In other embodiments of the present technology, the communication network 112 can be implemented differently, such as any wide-area communications network, local-area communications network, a private communications network and the like.

How the given communication link 114 is implemented is not particularly limited and will depend on how the associated one of the first client device 104, the second client device 106, the third client device 108 and the fourth client device 110 are implemented. Merely as an example and not as a limitation, in those embodiments of the present technology where at least one of the first client device 104, the second client device 106, the third client device 108 and the fourth client device 110 is implemented as a wireless communication device (such as a smart-phone), the associated one of the communication link 114 can be implemented as a wireless communication link (such as but not limited to, a 3G communications network link, a 4G communications network link, a Wireless Fidelity, or WiFi® for short, Bluetooth® and the like). In those examples, where at least one of the first client device 104, the second client device 106, the third client device 108 and the fourth client device 110 are implemented respectively as laptop, smartphone, tablet computer, the associated communication link 114 can be either wireless (such as the Wireless Fidelity, or WiFi® for short, Bluetooth® or the like) or wired (such as an Ethernet based connection).

It should be expressly understood that implementations for the plurality of client devices 102 including the first client device 104, the second client device 106, the third client device 108, the fourth client device 110, the communication link 114 and the communication network 112 are provided for illustration purposes only. As such, those skilled in the art will easily appreciate other specific implementational details for the first client device 104, the second client device 106, the third client device 108, the fourth client device 110 and the communication link 114 and the communication network 112. As such, by no means, examples provided herein above are meant to limit the scope of the present technology.

While only four client devices 104, 106, 108 and 110 are illustrated (all are shown in FIG. 1), it is contemplated that any number of client devices in the plurality of client devices 102 could be connected to the system 100. It is further contemplated that in some implementations, the number of client devices in the plurality of client devices 102 included in the system 100 could number in the tens or hundreds of thousands.

Search Engine Server

Also coupled to the communication network 112 is the aforementioned search engine server 120. The search engine server 120 can be implemented as a conventional computer server. In an example of an embodiment of the present technology, the search engine server 120 can be implemented as a Dell™ PowerEdge™ Server running the Microsoft™ Windows Server™ operating system. Needless to say, the search engine server 120 can be implemented in any other suitable hardware and/or software and/or firmware or a combination thereof. In the depicted non-limiting embodiment of present technology, search engine server 120 is a single server. In alternative non-limiting embodiments of the present technology, the functionality of the search engine server 120 may be distributed and may be implemented via multiple servers. In some embodiments of the present technology, the search engine server 120 is under control and/or management of a search engine operator. Alternatively, the search engine server 120 can be under control and/or management of a service provider.

The search engine server 120 maintains a search log database 122, the search log database 122 including an index 124.

Generally speaking, the purpose of the search engine server 120 is to: (i) discover and index documents available on the Web; (ii) execute searches in response to a given search query; (iii) execute analysis of documents and perform ranking of documents in response to the given search query; (iv) group the documents and compile the search engine result page (SERP) to be outputted to a client device (such as one of the first client device 104, the second client device 106, the third client device 108 and the fourth client device 110), the client device having been used to submit the given search query that resulted in the SERP.

How the search engine server 120 is configured to discover and index documents, execute searches, analysis and ranking of documents is not particularly limited. Those skilled in the art will appreciate several ways and means to implement the search engine server 120 and as such, several structural components of the search engine server 120 will only be described at a high level.

The search engine server 120 is configured to execute a document discovery procedure (not depicted), which is generally used by the search engine server 120 for discovering documents available over the communication network 112. For example, the search engine server 120 is configured to execute a "crawler" application that "visits" network resources available over the communication network 112 and downloads them for further processing.

The nature of documents that the search engine server 120 is configured to visit and download is not particularly limited but, for sake of illustration only, the documents described herein may be representative of web pages, images, PDFs, Word™ documents, PowerPoint™ documents that are available over the communication network 112.

The search engine server 120 may also be configured to execute an indexing procedure (not depicted), which is generally used by the search engine server 120 for building and/or maintaining indexing structures employed by the given search engine for performing searches. For example, the search engine server 120 is configured to build and/or maintain an inverted index, which will be referred to as the index 124.

How the index 124 is implemented in the present technology is not particularly limiting but, just as an example, the index 124 comprises a number of posting lists each on which is associated with a respective "searchable term". A given posting in a given posting list includes some type of data that is indicative of a given document that includes the searchable term associated with the given posting list and, optionally, includes some additional data (for example, where in the document the searchable term appears, number of appearances in the document, and the like). In summary, every posting list corresponds to a searchable term, and comprises a series of postings referencing each of the discovered documents that contain at least one occurrence of that respective searchable term (or a portion thereof).

It should be mentioned that additional data, such as features of the indexed documents, may also be found in a given posting; for example, the number of occurrences of a given searchable term in a given document; whether this search term occurs in the title of the given document, etc. Naturally, this additional data may be different depending on the given search engine and inter alia various implementations of the present technology.

Searchable terms are typically, but not exclusively, words or other character strings. A given search engine may typically deal with practically every word in a number of different languages, as well as proper names, numbers, symbols, etc. A very commonly used word may have a posting list of as many as one billion postings (or even more).

The search engine server 120 may also be configured to execute a querying procedure (not depicted), which is generally used by the search engine server 120 for identifying documents that may contain some part of a given query submitted to the given search engine. For example, when a given query (such as a current query of a user of the first client device 104, for example) is received by the search engine server 120, the search engine server 120 may parse the given query into a plurality of searchable terms. The search engine server 120 may then access the index 124 and identify posting lists that are associated with at least one of the plurality of searchable terms. As a result, the search engine server 120 may access at least some postings in the so-identified posting lists and identify at least some documents that may contain at least some of the plurality of searchable terms of the given query.

The search engine server 120 is configured to execute ranking of the identified documents in the index 124 that contain at least some of the plurality of searchable terms of the given query.

Just as an example and not as a limitation, some of the known techniques for ranking search results by relevancy to the user-submitted search query are based on some or all of: (i) how popular a given search query or a response thereto is in searches; (ii) how many results have been returned; (iii) whether the search query contains any determinative terms (such as "images", "movies", "weather" or the like), (iv) how often a particular search query is typically used with determinative terms by other users; and (v) how often other uses performing a similar search have selected a particular resource or a particular vertical search results when results were presented using the SERP. The search engine server 120 can thus calculate and assign a relevance score (based on the different criteria listed above) to each search result obtained in response to a user-submitted search query and generate a SERP, where search results are ranked according to their respective relevance scores. It is contemplated that ranking of documents as search results may be executed in more than one step.

In the embodiment illustrated herein, the search engine server 120 executes a plurality of machine learning algorithms (MLAs) 200 for ranking documents in response to a given query. The plurality of MLAs 200 will be described in more detail herein below.

In some embodiments of the present technology, the search engine server 120 can execute ranking for several types of searches, including but not limited to, a general search and a vertical search.

Tracking Server

Also coupled to the communication network 112 is the above-mentioned tracking server 130. The tracking server 130 can be implemented as a conventional computer server. In an example of an embodiment of the present technology, the tracking server 130 can be implemented as a Dell™ PowerEdge™ Server running the Microsoft™ Windows Server™ operating system. Needless to say, the tracking server 130 can be implemented in any other suitable hardware and/or software and/or firmware or a combination thereof. In the depicted non-limiting embodiment of present technology, the tracking server 130 is a single server. In alternative non-limiting embodiments of the present technology, the functionality of the tracking server 130 may be distributed and may be implemented via multiple servers. In other embodiments, the functionality of the tracking server 130 may be performed completely or in part by the search engine server 120. In some embodiments of the present technology, the tracking server 130 is under control and/or management of a search engine operator. Alternatively, the tracking server 130 can be under control and/or management of another service provider.

Generally speaking, the tracking server 130 is configured to track user interactions with search results provided by the search engine server 120 in response to user requests (e.g. made by users of one of the first client device 104, the second client device 106, the third client device 108 and the fourth client device 110). The tracking server 130 may track user interactions (such as, for example, click-through data) when users perform general web searches and vertical web searches on the search engine server 120, and store the user interactions in a tracking database 132.

The tracking server 130 may also be configured to automatically determine user interactions parameters based on tracked user interactions with search results. As a non-limiting example, the tracking server 130 may compute a click-through rate (CTR), at predetermined intervals of time or upon receiving an indication, based on a number of clicks on an element and number of times the element was shown (impressions) in a SERP.

Non-limiting examples of user interactions tracked by the tracking server 130 include:
  Loss/Win: was the document clicked in response to the search query or not.
  Views: how many times the document was shown.
  Dwell time: time a user spends on a document before returning to the SERP.
  Long/short click: was the user interaction with the document long or short, compared to the user interaction with other documents on the SERP.

Naturally, the above list is non-exhaustive and may include other types of user interactions without departing from the scope of the present technology. In some embodiments, the tracking server 130 may compile user interaction data (which may, as a non-limiting example, include user interactions for every hour) and generate user interactions to be stored in the tracking database 132 in a suitable format for implementing the present technology (which, may as a non-limiting example, be user interactions for a predetermined period of time of 3 months). In other embodiments, the tracking server 130 may store the user interaction data in a raw form in the tracking database 132, such that it can be retrieved and compiled by at least one of the search engine server 120, the training server 140, or another server (not depicted) in a suitable format for implementing the present technology.

The tracking server 130 typically maintains the above-mentioned tracking database 132, the tracking database 132 including a query log 136 and a user interaction log 138.

The purpose of the query log 136 is to log searches that were made using the search engine server 120. More specifically, the query log 136 maintains terms of search queries (i.e. the associated search words) and the associated search results. It is noted that the query log 136 can be maintained in an anonymized manner—i.e. search queries are not trackable to the users who have submitted the search query.

More specifically, the query log 136 may include a list of queries with their respective terms, with information about documents that were listed by the search engine server 120 in response to a respective query, a timestamp, and may also contain a list of users identified by anonymous IDs (or without an ID altogether) and the respective documents they have clicked on after submitting a query. In some embodiments, the query log 136 may be updated every time a new search is performed on the search engine server 120. In other embodiments, the query log 136 may be updated at predetermined intervals of time. In some embodiments, there may be a plurality of copies of the query log 136, each corresponding to the query log 136 at different points in time.

The user interaction log 138 may be linked to the query log 136, and list user interactions as tracked by the tracking server 130 after a user has submitted a query and clicked on one or more documents on a SERP on the search engine server 120. As a non-limiting example, the user interaction log 138 may contain a reference to a document, which may be identified by an ID number or an URL, a list of queries, where each query of the list of queries has been used to access the document, and respective user interactions associated with the document for the respective query of the list of queries (if the document was interacted with), which will be described in more detail herein below. The plurality of user interactions may generally be tracked and compiled by the tracking server 130, and in some embodiments may be listed for each individual user.

In some embodiments, the tracking server 130 may send tracked queries, search result and user interactions to the search engine server 120, which may store the tracked queries, user interactions and associated search results in the search log database 122. In alternative non-limiting embodiments of the present technology, the functionality of the tracking server 130 and the search engine server 120 can be implemented by a single server.

Training Server

Also coupled to the communications network is the above-mentioned training server 140. The training server 140 can be implemented as a conventional computer server. In an example of an embodiment of the present technology, the training server 140 can be implemented as a Dell™ PowerEdge™ Server running the Microsoft™ Windows Server™ operating system. Needless to say, the training server 140 can be implemented in any other suitable hardware and/or software and/or firmware or a combination thereof. In the depicted non-limiting embodiment of present technology, the training server 140 is a single server. In alternative non-limiting embodiments of the present technology, the functionality of the training server 140 may be distributed and may be implemented via multiple servers. In the context of the present technology, the training server 140 may implement in part the methods and system described herein. In some embodiments of the present technology, the training server 140 is under control and/or management of a search engine operator. Alternatively, the training server 140 can be under control and/or management of another service provider.

Generally speaking, the training server 140 is configured to train the plurality of MLAs 200 used by the search engine server 120, the tracking server 130 and/or other servers (not depicted) associated with the search engine operator. The training server 140 may, as an example, train one or more MLAs associated with the search engine provider for optimizing general web searches, vertical web searches, providing recommendations, predicting outcomes, and other applications. The training and optimization of the MLAs may be executed at predetermined periods of time, or when deemed necessary by the search engine provider.

In the context of the present technology, the training server 140 is configured to: (i) generate annotation vectors for documents in the index 214; (ii) generate query vectors for past queries based on past search results and past user interaction, and compute similarity between the past queries based on the query vectors; and (iii) train an MLA in the plurality of MLAs 200 to determine similarity based on textual content of new queries (queries not having past user interactions or search results). However, the non-limiting embodiments of the present technology can also be applied to the new query that is either similar or the same as one of the past queries.

The training server 140 may maintain a training database 142 for storing annotation vectors and/or training objects and/or other information that may used by the search engine server 120, the tracking server 130 and/or other servers (not depicted) associated with the search engine operator.

Figure 2:
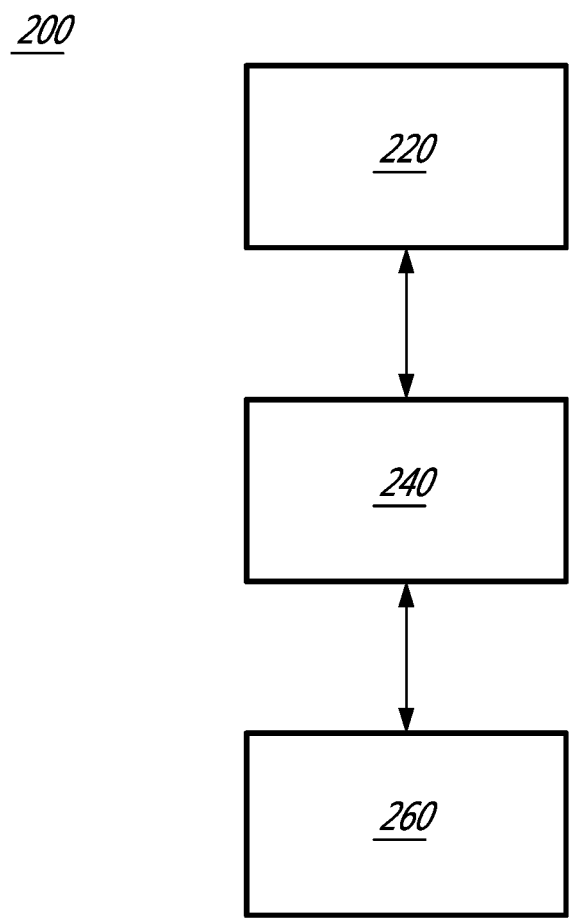
FIG. 2 depicts a schematic diagram of a plurality of machine learning algorithms implemented by the search engine server of FIG. 1 in accordance with embodiments of the present technology.

Now turning to FIG. 2, the plurality of MLAs 200 are illustrated in accordance with non-limiting embodiments of the present technology. The plurality of MLAs 200 includes a first MLA 220, a second MLA 240, a third MLA 260 and a fourth MLA 280.

The first MLA 220 may generally be configured to rank search results on the search engine server 120 and may implement a gradient boosted decision tree algorithm (GBRT). Briefly speaking, GBRT is based on decision trees, whereby a prediction model in the form of an ensemble of trees is generated. The ensemble of trees is built in a stage-wise manner. Each subsequent decision tree in the ensemble of decision trees focuses training on those previous decision tree iterations that were "weak learners" in the previous iteration(s) of the decision trees ensemble (i.e. those that are associated with poor prediction/high error). Boosting is a method aimed at enhancing prediction quality of an MLA. In this scenario, rather than relying on a prediction of a single trained algorithm (i.e. a single decision tree) the system uses many trained algorithms (i.e. an ensemble of decision trees), and makes a final decision based on multiple prediction outcomes of those algorithms.

In boosting of decision trees, the first MLA 220 first builds a first tree, then a second tree, which enhances the prediction outcome of the first tree, then a third tree, which enhances the prediction outcome of the first two trees and so on. Thus, the first MLA 220 in a sense is creating an ensemble of decision trees, where each subsequent tree is better than the previous, specifically focusing on the weak learners of the previous iterations of the decision trees. Put another way, each tree is built on the same training set of training objects, however training objects, in which the first tree made "mistakes" in predicting are prioritized when building the second tree, etc. These "tough" training objects (the ones that previous iterations of the decision trees predict less accurately) are weighted with higher weights than those where a previous tree made satisfactory prediction.

The first MLA 220 may thus be used for classification and/or regression and/or ranking by the search engine server 120. The first MLA 220 may be the main ranking algorithm of the search engine server 120, or may be part of the ranking algorithm of the search engine server 120.

The second MLA 240 may execute a modified deep structured semantic model (DSSM). Generally, the purpose of the second MLA 240 is to enrich document features such that the features may be used by the first MLA 320 for ranking documents based on a relevance score. The second MLA 240 is configured to train the modified DSSM on at least a search query and a title of a document. The modified DSSM generally receives as an input word unigrams (entire words), word bigrams (pairs of words) and word trigrams (sequences of three words). In some embodiments, the modified DSSM may also receive as an input word n-grams, where n is greater than 3. The modified DSSM is also trained on user interaction parameters, such as, but not limited to: click/no-click which may be weighted by dwell time or log(dwell time), depth of the click, click abandonment, number of unique clicks per session, CTR, etc. The output of the second MLA 240 may be used as an input by the first MLA 220. In some embodiments of the present technology, the first MLA 220 and the second MLA 240 may be implemented by a single MLA.

The third MLA 260 may be generally configured to compare search queries part of a pair of search queries, and to generate similarity parameters that are indicative of a similarity level between the queries of the pair. The third MLA 260, once trained, may also be configured to determine a past query that is similar to a currently submitted query, based on at least a similarity analysis of the past query and the currently submitted query.

The third MLA 260 may be trained on a set of training objects to learn relationships between queries of a pair and a similarity parameter, which have been generated based on similar search results obtained in response to the queries and the associated user interaction parameters. As a non-limiting example, the third MLA 260 may use textual content and features of the queries that are part of the pair to establish the relationship between the queries and the similarity parameter. Once trained, the third MLA 260 may then be able to select a similar query when presented with a new and unseen query, and predict a similarity parameter, which may be used as a feature by the first MLA 220 and/or the second MLA 240. In the embodiments illustrated herein, the third MLA 260 may be implemented as a neural network.

Figure 3:
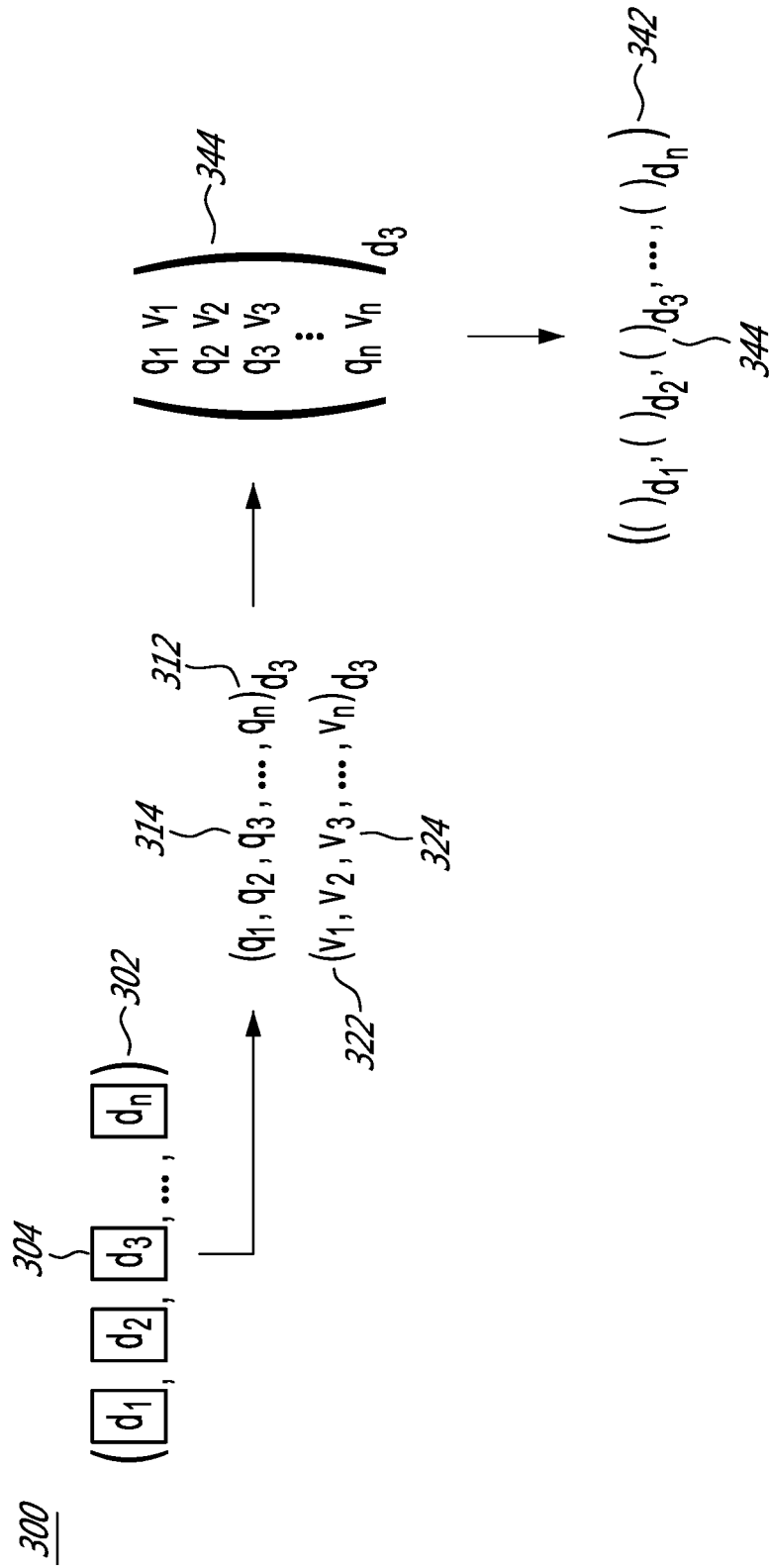
FIG. 3 depicts a schematic diagram of an annotation generation procedure in accordance with embodiments of the present technology.

With reference to FIG. 3, there is illustrated an annotation generation procedure 300 in accordance with non-limiting embodiments of the present technology.

The training server 140 is configured to execute the annotation generation procedure 300. The annotation generation procedure 300 may be executed offline by the training server 140.

Annotation Generation Procedure

Generally speaking, the purpose of the annotation generation procedure 300 is to generate an annotation for a document available in the index 124 of the search engine server 120. The annotation for a document is generally a representation of one or more queries having been used to access the document on the search engine server 120, which may be represented in a form of an annotation vector. In some embodiments of the present technology, the annotation vector may further include respective user interaction parameters for the one or more queries, the respective user interaction parameters being indicative of past user interactions with the document provided in response to the respective one or more queries. In alternative embodiments of the present technology, the annotation vector for the document may also include document features and/or respective query features, as well as other ranking parameters, such as respective relevance scores of the document in response to the respective one or more queries for example.

In the context of the present technology, the annotation vector of a document allows determining to which queries the document is at least partially relevant to, and indicates, for each of the queries, user interest in the document.

The training server 140 retrieves a set of documents 302 from the index 124. How the training server 140 selects documents to be part of the set of documents 302 is not limited. As a non-limiting example, the training server 140 may select documents associated with most submitted queries, documents having received most user interactions, documents from predetermined "popular" sources (such as a Wikipedia™ page, for example) or may select documents randomly. It should be understood that the set of documents 302 may be an indication of each of the documents, feature vectors of the documents, or any other representation of the documents allowing their identification in the search log database 122.

The training server 140 retrieves, from the query log 136, for each respective document 304 of the set of documents 302, a respective set of queries 312, each respective query 314 in the respective set of queries 312 having been used to access the respective document 304 by one or more of the plurality of users (not depicted), the respective document having been presented in a SERP in response to the respective query 314.

In some embodiments of the present technology, the training server 140 retrieves, from the user interaction log 138, a set of user interaction parameters 322, each respective user interaction parameter 324 being associated with a respective query 314 of the set of past queries 312, the respective user interaction parameter 324 being indicative of user interaction(s) with the respective document 304 in response to the respective query 314. It is contemplated that the training server 140 may acquire user interaction data in a raw form, and generate the respective user interaction parameter 322 for each respective query 314, e.g. the training server 140 may acquire a number of clicks on the document 304 in response to the respective query 314, and acquire a number of impressions (i.e. times the document 304 was shown in response to the respective query 314), and generate a respective CTR. In other embodiments, the training server 140 may directly acquire each respective user interaction parameters 322, which may have been generated previously, as an example by the tracking server 130, and stored in the user interaction log 138.

The training server 140 generates a respective annotation vector 344 for the document 304 based on the respective set of queries 312. In some embodiments of the present technology, the respective annotation vector 344 is generated based on the respective set of past queries 312 and the respective set of user interaction parameter 322. Additionally, in some embodiments of the present technology, the respective annotation vector 344 may be generated further based on document features of the document 304 and/or respective query features of the respective set of queries 312, as well as respective relevance scores of the document 304 in response to each respective query 314. In some embodiments of the present technology, the respective annotation vector 344 may only include queries from the respective set of past queries 312 having a respective user interaction parameter 322 above a predetermined threshold. Additionally or alternatively, a number of queries in the respective annotation vector 344 may be predetermined, and the training server 140 may only include, a predetermined number of queries having a highest value of the respective user interaction parameter 324.

How the training server 140 generates each respective annotation vector 344 in accordance with some embodiments of the present technology is described in a Russian Federation Patent Application No. 2017146890 entitled "METHOD OF AND SYSTEM FOR GENERATING ANNOTATION VECTORS FOR DOCUMENT", and filed on Dec. 29, 2017, content of which is incorporated herein by reference in its entirety and, therefore, will not be described in greater detail herein. Suffice it to say the respective annotation vector 344 associated with the document 304 provides at least an indication of at least a portion the set of past queries 312 having been used to access the document 304. The training server 140 generates a set of annotation vectors 342, where each respective annotation vector 344 is associated with the respective document 304 in the set of documents 302.

The training server 140 stores the set of annotation vectors 342 in the training database 142. The training server 140 may repeat the annotation generation procedure 300 at predetermined intervals of time for generating new annotation vectors for documents in the index 124, and updating the set of annotation vectors 342 (i.e. to reflect changes in each respective document 304, addition of new queries leading to the respective document 304, and updating of the set of user interaction parameters 322).

Figure 4:
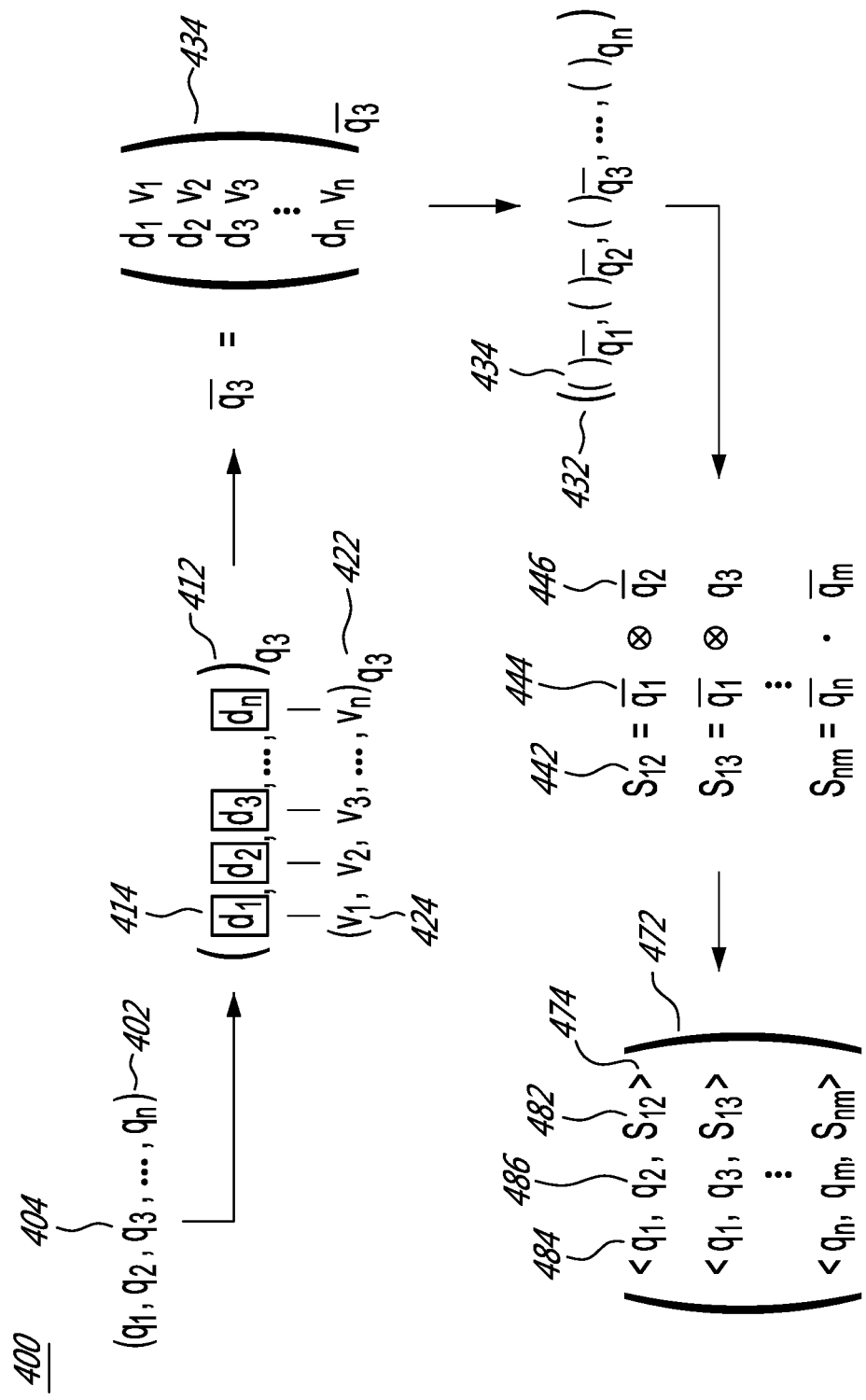
FIG. 4 depicts a schematic diagram of a first similarity parameter generation procedure in accordance with embodiments of the present technology.

Now turning to FIG. 4, there is depicted a first similarity parameter generation procedure 400 in accordance with non-limiting embodiments of the present technology.

Similarity Parameter Based on Overlapping Search Results

The first similarity parameter generation procedure 400 is executed by the training server 140.

Generally speaking, the purpose of the first similarity parameter generation procedure 400 is to determine a level of similarity between two search queries by using as a proxy overlapping search results having been presented in response to the search queries, which may be weighted by respective user interaction parameters indicative of past user interactions with respective search results. To achieve that purpose, the training server 140 is configured to: (ii) acquire a set of queries, and respective search results having been presented in response to each of the queries of the set of queries; (ii) generate a respective query vector for each query of the set of queries, the respective query vector including an indication the respective search results having been presented in response to the respective query; (iii) determine a similarity parameter for a given pair of queries by comparing their respective query vectors, the similarity parameter being indicative of a degree of similarity between the queries in the given pair; and (iv) store the respective similarity parameter in association with an indication of the pair of queries.

In some embodiments of the present technology, the first similarity parameter generation procedure 400 may be executed offline, and the results (i.e. respective first similarity parameters) may be stored in the training database 142 and/or in the search log database 122. The respective similarity parameters for pairs of queries may be used directly by one or more of the plurality of MLAs 200 of the search engine server 120 for, inter alia, generating features for documents. The respective similarity parameters for pairs of queries may also be used by the training server 140 to train the third MLA 260 to generate a second similarity parameter for unseen queries based on their textual content, which will be explained in more detail herein below.

The training server 140 retrieves a set of queries 402 from the query log 136, where each respective query 404 of the set of queries 402 has been previously submitted on the search engine server 120 by one or more users via the plurality of client devices 102. In some embodiments of the present technology, the training server 140 retrieves the set of queries 402 from the search engine server 120 upon receiving an indication.

How the training server 140 selects queries to be part of the set of queries 402 is not limited. As a non-limiting example, the training server 140 may select a predetermined number of most submitted queries on the search engine server 120, most submitted recent queries on the search engine server 120 (i.e. queries having a highest number of submission for a predetermined time period before the current time), queries associated with documents having a high number of user interactions on the search engine server 120, queries having a pre-determined number or pre-determined type of search terms, and the like.

In some embodiments of the present technology, queries in the set of queries 402 may be retrieved by the training server 140 upon receiving an indication of a given annotation vector associated with a given document (not depicted), and the set of queries 402 may include a given query and queries in the given annotation vector (queries having been used to access the given document).

The training server 140, retrieves, from the query log 136, for each respective query 404 of the set of queries 402, a respective set of documents 412 associated with the respective query 404, the respective set of documents 412 having been presented as search results to the plurality of users (not depicted) in response to the respective query 404 on the search engine server 120. The respective set of documents 412 generally includes a predetermined number of documents, such as the top 100 most relevant documents that have been presented in a SERP in response to the respective query 404. In other embodiments, the set of documents 412 may include all documents having been presented as search results in response to the respective query.

In some embodiments of the present technology, the training server 140 retrieves, for each respective set of documents 412 associated with the respective query 404, a respective set of user interaction parameters 422, each respective user interaction parameter 424 being indicative of past interactions from users with the respective document 414 in response to the respective query 404. It is contemplated that the training server 140 may acquire user interaction data in a raw form, and generate the respective user interaction parameter 424 for each respective document 414, e.g. the training server 140 may acquire a number of clicks on the respective document 414 in response to the respective query 404, and acquire a number of impressions (i.e. number of times the respective document 414 was shown in response to the respective query 404), and generate a respective CTR. In other embodiments, the training server 140 may directly acquire each respective user interaction parameter 424, which may have been computed previously, as an example by the tracking server 130, and stored in the user interaction log 138.

The training server 140 generates, for each query 404 of the set of queries 402, based on the respective set of documents 412, a respective query vector 434. In some embodiments of the present technology, the training server 140 generates the respective query vector 434 based on the respective set of documents 412 and the set of user interaction parameters 422.

How the training server 140 generates each respective query vector 434 in accordance with some embodiments of the present technology is described in a Russian Federation Patent Application No. 2018122689 entitled "METHOD OF AND SYSTEM FOR RANKING SEARCH RESULTS USING MACHINE LEARNING ALGORITHM", filed on Jun. 21, 2017, content of which is incorporated herein by reference in its entirety and, therefore, will not be described in greater detail herein. Suffice it to say that the purpose of the respective query vector 434 is to represent information about search results and optionally user interaction parameters obtained in response to the respective query 404 in a vector such that it can be compared with another respective vector associated with another query, and that a similarity between the queries may be assessed by the respective query vectors as a proxy.

The training server 140 outputs a set of query vectors 432, each respective query vector 434 being associated with the respective query 404 of the set of queries 402.

In some embodiments of the present technology, the training server 140 stores, in the training database 142, the set of query vectors 432 in association with the set of queries 402, where each respective query vector 434 is associated with a respective query 404.

Having generated the respective query vectors 434, the training server 140 compares respective queries 404 in the set of queries 402 based on the respective query vectors 434.

The training server 140 generates a respective first similarity parameter 442 between a first given query and a second given query (not depicted) based on the first query vector 444 (representing the first given query) and the second query vector 446 (representing the second given query). The respective first similarity parameter 442 is indicative of a degree of similarity between the first given query and the second given query by using the respective search results of the first given query and the second given query (not depicted) as a proxy. Thus, generally speaking, the more search results the first given query and the second given query have in common, the higher the first similarity parameter 442 is, and vice versa. In some embodiments of the present technology, the similar search results may be weighted by the respective associated user interaction parameters 424.

As a non-limiting example, the first similarity parameter 442 may be generated by determining a cosine similarity between the first query vector 444 and the second query vector 446.

The training server 140 generates a respective training object 474, the respective training object 474 including an indication of the first given query 484, an indication of the second given query 486 and the respective first similarity parameter 482.

The training server 140 may generate a respective first similarity parameter 482 for each possible pair of queries in the set of queries 402 based on the respective query vectors 434 in the set of query vectors 432 in a similar manner as described above to obtain a set of training objects 472.

The training server 140 stores the set of training objects 472 in the training database 142.

Figure 5:
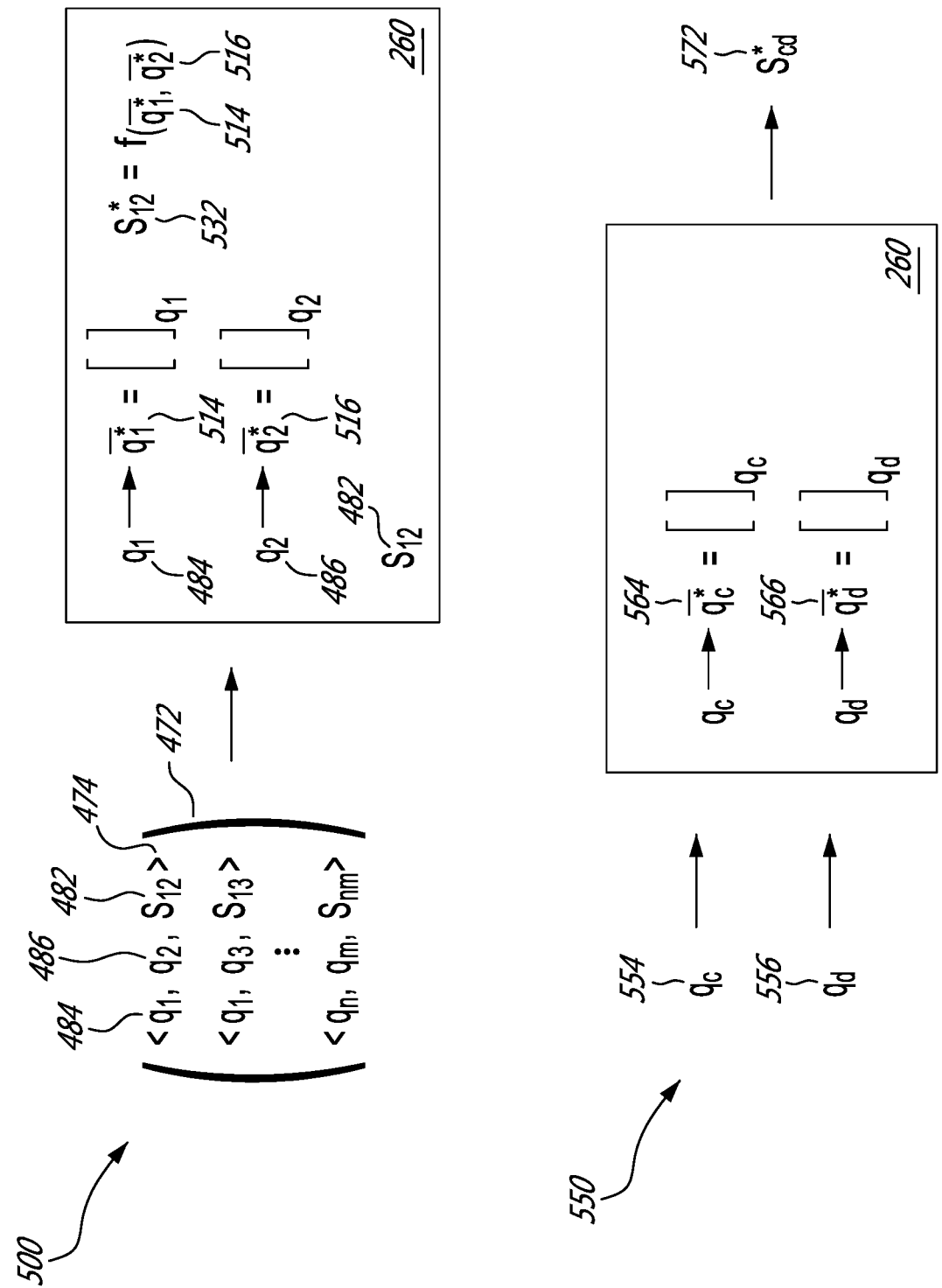
FIG. 5 depicts a schematic diagram of a second similarity parameter generation procedure in accordance with embodiments of the present technology.

Now turning to FIG. 5, there is depicted a training procedure 500 of the third MLA 260 and a second similarity parameter generation procedure 550 executed by the third MLA 260 in accordance with non-limiting embodiments of the present technology.

The training procedure 500 is executed by the training server 140.

Similarity Parameter Based on Textual Content

The training server 140 is configured to execute training procedure 500 for training the third MLA 260 to determine a similarity parameter between two queries based on the textual content of the queries. The third MLA 260 is trained on the set of training objects 472 previously generated during the first similarity parameter generation procedure 400.

The training server 140 retrieves, from the training database 142, the set of training objects 472, a respective training object 474 of the set of training objects including: an indication of a first given query 484, an indication of second given query 486, and a respective first similarity parameter 482, the respective first similarity parameter 482 having been computed during the first similarity parameter generation procedure 400, the respective first similarity parameter 482 being indicative of a degree of similarity between the first given query 484 and the second given query 486.

The training server 140 generates, based on the indication of the first given query 484 and the indication of the second given query 486 in the training object 474, a first word vector 514 and a second word vector 516 respectively. The first word vector 514 and the second word vector 516 are generated by execution of a word embedding algorithm (not depicted).

Generally, the purpose of a word embedding algorithm is to represent a word as a vector of real numbers by using a set of language modelling and features learning techniques in natural language processing (NLP). The type of the word embedding algorithm is not limited, and some examples include, but are not limited to: word2vec or Latent Dirichlet Allocation (LDA). The selected one or more word embedding algorithms are configured to create a word vector for a given query such that queries can be compared via their word vectors. It is contemplated that in some embodiments of the present technology, the word embedding algorithm may be executed by another trained MLA (not depicted).

The training server 140 trains the third MLA 260 on the set of training objects 472 to determine a respective second similarity parameter 532, the respective second similarity parameter 532 being indicative, for each training object 474, of a degree of similarity between the first given query 484 and the second given query 486 based on the first word vector 514 and the second word vector 516. To achieve that purpose, the training server 140 gives as an input the first word vector 514 (representing the first given query 484) and the second word vector 516 (representing the second given query 486), and as a label the respective first similarity parameter 482 between the first given query 484 and the second given query 486, the respective first similarity parameter 482 having been computed based on overlapping search results during the first similarity parameter generation procedure 400.

The third MLA 260 learns to generate the respective second similarity parameter 532 based on word vectors having been generated via a word embedding algorithm. How the training server 140 generates the respective second similarity parameter 532 based on word vectors in accordance with some embodiments of the present technology is described in a Russian Federation Patent Application No. 2018122689 entitled "METHOD OF AND SYSTEM FOR RANKING SEARCH RESULTS USING MACHINE LEARNING ALGORITHM", filed on Jun. 21, 2017, content of which is incorporated herein by reference in its entirety and, therefore, will not be described in greater detail herein.

Generally speaking, the respective second similarity parameter 532 generated based on the textual content of the queries (i.e. respective word vectors) should be homologous to the first similarity parameter 482 computed based on the respective search results of the queries. Further, after the training procedure 500, the third MLA 260 may generate the second similarity parameter 532 for two queries solely based on the respective word vector representations, which may allow to assess a degree of similarity between queries not having been submitted on the search engine server 120 in the past or lacking search results and/or user interactions.

After the training procedure 500, the third MLA 260 of the search engine server 120 executes the second similarity parameter generation procedure 550.

The third MLA 260 receives a first current query 554, for which similarity with at least one other past query needs to be assessed. The third MLA 260 receives a second past query 556, which is a past query having been previously submitted on the search engine server 120. The second past query 556 may have been retrieved by the search engine server 120 from the search log database 122 as an example based on an analysis of annotation vector (not depicted).

The third MLA 260 generates, via the word embedding algorithm, a first current word vector 564 and a second current word vector 566. It should be noted that the first current query 554 and/or the second past query 556 may not have been previously "seen" by the third MLA 260, i.e. the third MLA 260 has not been trained on the first current query 552 and/or the second past query 556.

The third MLA 260 computes a second similarity parameter 572 between the first current query 552 and the second past query 556 based on the first current word vector 562 and the second current word vector 566.

The third MLA 260 may then store and/or transmit the second similarity parameter 572 to the search engine server 120.

Figure 6:
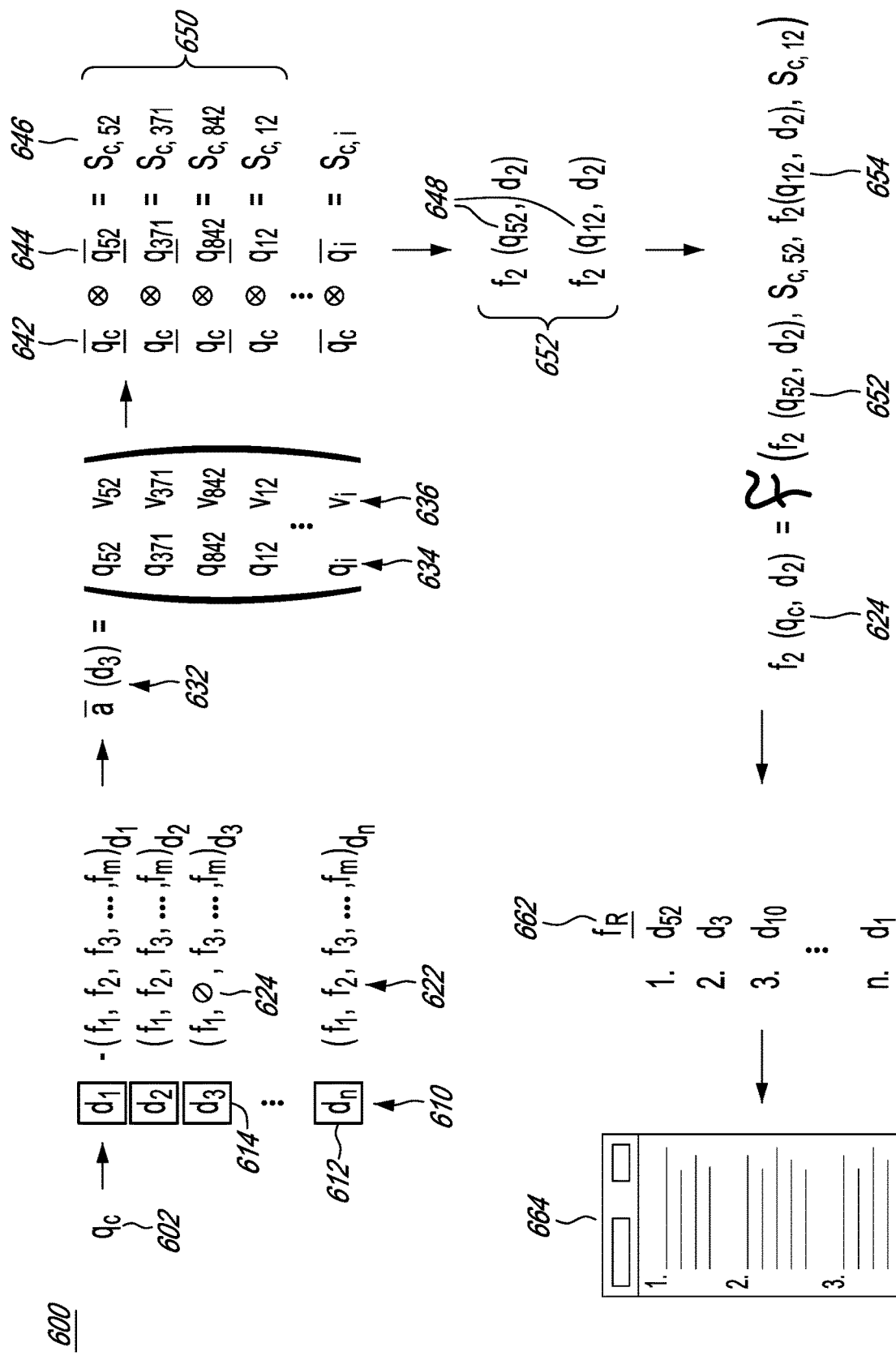
FIG. 6 depicts a schematic diagram of a feature value generation procedure in accordance with embodiments of the present technology

Having explained, with reference to FIGS. 3 to 5, how annotations vectors are generated and similarity between queries is determined, we shall now describe, with reference to FIG. 6, a feature value generation procedure 600 in accordance with non-limiting embodiments of the present technology.

The feature value generation procedure 600 is executed by the search engine server 120. The feature value generation procedure 600 may be executed in real-time when receiving a new query 602 from one of the plurality of client devices 102. In alternative embodiments of the present technology, the feature value generation procedure 600 may be executed in an offline mode, as an example by the training server 140, before receiving the new query 602 from the one of the plurality of client devices 102.

The search engine server 120 receives the new query 602 from an electronic device, such as the first client device 104.

The search engine server 120 retrieves, from the index 124, based on terms of the new query 602, a set of current documents 610 relevant to the new query 602, each current document 612 of the set of current documents 610 having a first plurality of features 622.

The search engine server 120 or the first MLA 220 selects a document 614 (which will be referred to as the selected document 614) in the set of current documents 610, the selected document 614 having no respective value for a given feature 624 of the first plurality of features 622. The given feature 624 may be a feature directly used by the first MLA 220 for ranking the selected document 614, or may be a feature that is used by the second MLA 240 to generate another feature (not depicted), which may be as a non-limiting example a predicted feature that may be used by the first MLA 220 to rank the selected document 614. As another non-limiting example, the second MLA 240 may not be able to generate the value for the given feature 624 based at least in part on past user interactions because the past user interactions are below a threshold (e.g. there is not enough past user interactions). The given feature 624 may be a query-dependent feature, or a predicted user interaction parameter.

Suffice it to say that due to an absence of value for the given feature 624, the first MLA 220 may lack information to rank the selected document 614 in response to the new query 602. Further, in other embodiments of the present technology, the given feature 624 may be a relevance score of the selected document 614.

The search engine server 120 retrieves from the training database 142, based on the selected document 614, an annotation vector 632 associated with the selected document 614. The annotation vector 632 has been generated during the annotation generation procedure 300, and includes: an indication of one or more past queries 634 having been used to access the selected document 614 on the search engine server 120, and in some embodiments of the present technology, respective user interaction parameters 636 for each of the one or more past queries 634.

In alternative embodiments of the present technology, where no annotation vectors have been previously generated, the search engine server 120 retrieves, from the query log 136, the one or more past queries 634 having been used to access the selected document 614 on the search engine server, and optionally acquire, from the user interaction log 138, respective user interaction parameters for the one or more past queries 634 associated with the selected document 614.

The search engine server 120 generates: (i) a new query vector 642 for the new query 602, and (ii) respective query vectors 644 for each of the one or more past queries 634 having been used to access the selected document 614 based on the one or more past queries 634 in the annotation vector 632, and (iii) respective similarity parameters 646 between the new query 602 and the one or more past queries 634 based on the given query vector 642 and the respective query vectors 644.

In some embodiments of the present technology, the search engine server 120 may retrieve at least a portion of the respective query vectors 644 and the new query vector 642 from the training database 142, if the respective query vectors 644 the new query vector 642 have been previously generated by the training server 140 during the first similarity parameter generation procedure 400. Additionally or alternatively, the search engine server 120 may cause the training server 140 to execute the first similarity parameter generation procedure 400 to generate the respective query vectors 644 and the new query vector 642.

The search engine server 120 may then determine the respective similarity parameters 646 between the new query 602 and the one or more past queries 634 based on the given query vector 642 and the respective query vectors 644, as a non-limiting example by determining a cosine similarity.

In other embodiments of the present technology, the search engine server 120 may use the third MLA 260 having been trained during the training procedure 500 to generate the respective query vectors 644 and the new query vector 642 by executing a word embedding algorithm, and generate the respective similarity parameters 646 between the new query 602 and the one or more past queries 634 based on the given query vector 642 and the respective query vectors 644 by executing the second similarity parameter generation procedure 550.

The search engine server 120 then selects at least one past query (which will be referred to as selected past queries 648) based on the respective similarity parameters 650. In some embodiments of the present technology, the selected past queries 648 may be selected based on their respective similarity parameters 650 being above a predetermined threshold. Additionally or alternatively, the search engine server 120 may select the selected past queries 648 based on the respective similarity parameters 650 being above all other respective similarity parameters 646. A number of past queries in the selected past queries 648 may be predetermined, or may include a single past query. In the latter example, the single past query may have been selected based on its respective similarity parameter with the new query 602 being above other respective similarity parameters.

The search engine server 120 retrieves, based on the selected past queries 648, respective values 652 of the given feature 624 for the selected document 614. It should be noted that in some embodiments of the present technology, respective values 652 of the given feature 624 for the selected document 614 may be retrieved before generating the respective similarity parameters 646.

The MLA 126 may then generate the value of the given feature 624 for the selected document 614 in response to the new query 602 based on: the respective similarity parameters 650 and the respective values 652 of the given feature 624 for the selected document 614.

As a non-limiting example, the first MLA 220 and/or the second MLA 240 may average the respective values 652 of the given feature 624 weighted the respective similarity parameters 650. As another non-limiting example, the first MLA 220 may directly use the respective values 652 of the given feature 624 as the value of the given feature 624 for the selected document 614 in response to the new query 602. As another non-limiting example, the first MLA 220 and/or the second MLA 240 may apply another type of function or use another MLA to generate the value of the given feature 624 for the selected document 614 based on: the respective similarity parameters 650 and the respective values 652 of the given feature 624 for the selected document 614.

The first MLA 220 then ranks the set of current documents 610 based on the first plurality of features 622, where the selected document 614 is ranked at least in part based on the value of the given feature 624 which was generated based the respective similarity parameters 650 and the respective values 652 of the given feature 624, to obtain final ranked list of documents 662.

The search engine server 120 then generates a SERP 664 including the final ranked list of documents 662, and transmits the SERP 664 to the first client device 104.

It should be noted that more than one document may lack values for the given feature, and other documents may lack values for other features. The feature value generation procedure 600 may be executed in a similar manner for each of the lacking values.

Figure 7:
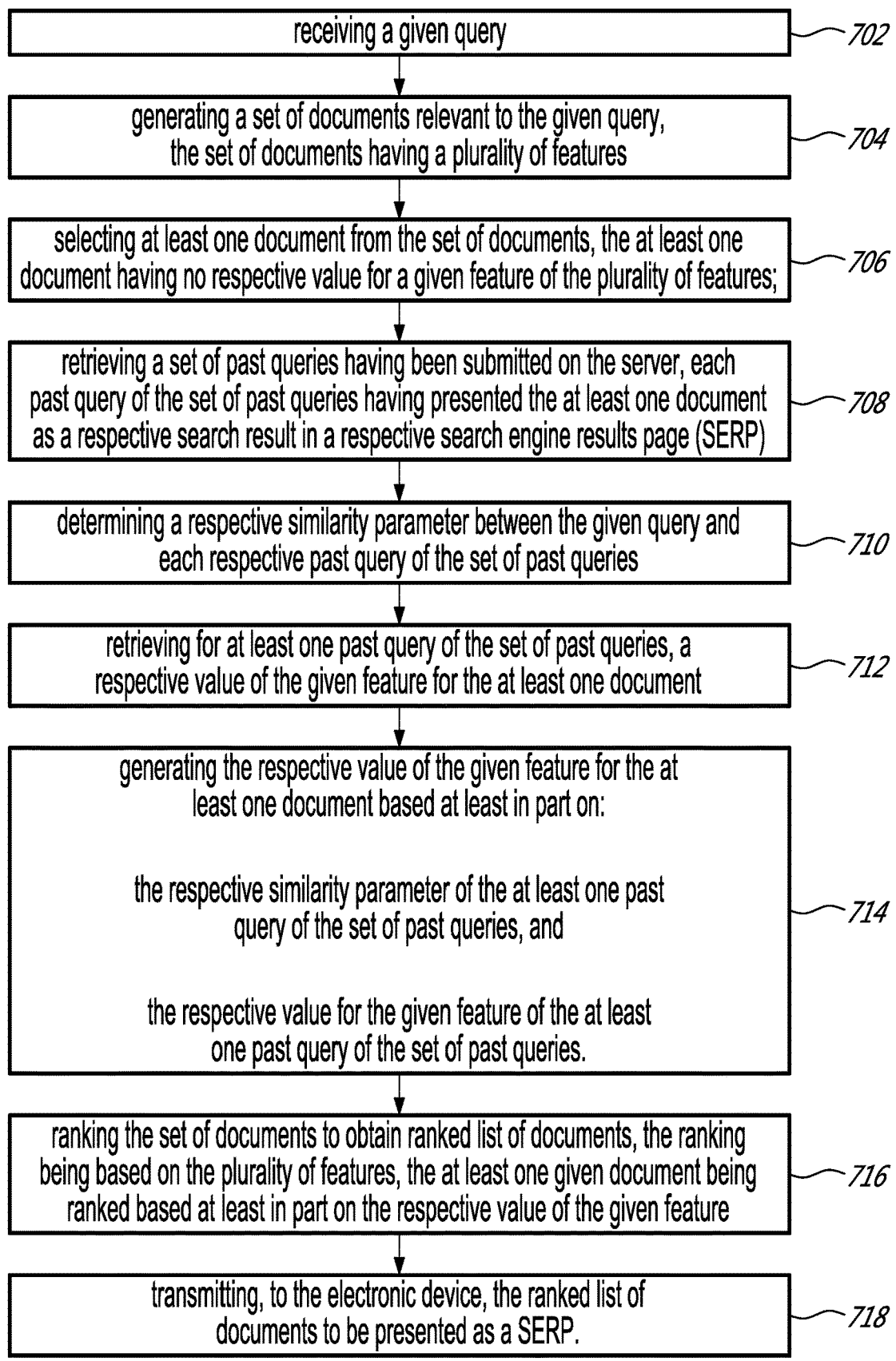
FIG. 7 depicts a block diagram of a method for generating a feature for ranking documents, the method executable within the system of FIG. 1 in accordance with embodiments of the present technology.

FIG. 7 depicts a block diagram of a method 700 for generating a given feature for ranking a document in response to a given query, the document not having a value for the given feature for the given query, the method 700 being executed in accordance with non-limiting embodiments of the present technology.

The method 700 is executed by the search engine server 120, and by the training server 140.

The method 700 begins at step 702.

Step 702: Receiving a Given Query

At step 702, search engine server 120 receives the new query 602 from an electronic device, such as the first client device 104.

The method 700 then advances to step 704.

Step 704: Generating a Set of Documents Relevant to the Given Query, the Set of Documents Having a Plurality of Features At step 704, The search engine server 120 retrieves, from the index 124, based on terms of the new query 602, a set of current documents 610 relevant to the new query 602, each current document 612 of the set of current documents 610 having a first plurality of features 622.

The method 700 then advances to step 706.

Step 706: Selecting at Least One Document from the Set of Documents, the at Least One Document Having No Respective Value for a Given Feature of the Plurality of Features;

At step 706, the search engine server 120 selects a document 614 (which will be referred to as the selected document 614) in the set of current documents 610, the selected document 614 having no respective value for a given feature 624 of the first plurality of features 622. The given feature 624 may be a feature directly used by the first MLA 220 for ranking the selected document 614, or may be a feature that is used by the second MLA 240 to generate another feature (not depicted), which may then be used by the first MLA 220 to rank the selected document 614.

The method 700 then advances to step 708.

Step 708: Retrieving a Set of Past Queries Having been Submitted on the Server, Each Past Query of the Set of Past Queries Having Presented the at Least One Document as a Respective Search Result in a Respective Search Engine Results Page (SERP)

At step 708, the search engine server 120 retrieves from the training database 142, based on the selected document 614, an annotation vector 632 associated with the selected document 614. The annotation vector 632 has been generated during the annotation generation procedure 300, and includes: an indication of one or more past queries 634 having been used to access the selected document 614 on the search engine server 120, and in some embodiments of the present technology, respective user interaction parameters 636 for each of the one or more past queries 634.

In alternative embodiments of the present technology, where no annotation vectors have been previously generated, the search engine server 120 retrieves, from the query log 136, the one or more past queries 634 having been used to access the selected document 614 on the search engine server, and optionally acquire, from the user interaction log 138, respective user interaction parameters for the one or more past queries 634.

The method 700 then advances to step 710.

Step 710: Determining a Respective Similarity Parameter Between the Given Query and Each Respective Past Query of the Set of Past Queries At step 710, the search engine server 120 generates: (i) a new query vector 642 for the new query 602, and (ii) respective query vectors 644 for each of the one or more past queries 634 having been used to access the selected document 614 based on the one or more past queries 634 in the annotation vector 632.

In some embodiments of the present technology, the search engine server 120 may retrieve at least a portion of the respective query vectors 644 and the new query vector 642 from the training database 142, if the respective query vectors 644 the new query vector 642 have been previously generated by the training server 140 during the first similarity parameter generation procedure 400. Additionally or alternatively, the search engine server 120 may cause the training server to execute the first similarity parameter generation procedure 400 to generate the respective query vectors 644 and the new query vector 642.

The search engine server 120 may then determine the respective similarity parameters 646 between the new query 602 and the one or more past queries 634 based on the given query vector 642 and the respective query vectors 644, as an example by calculating a cosine similarity.

In other embodiments of the present technology, the search engine server 120 may use the third MLA 260 having been trained during the training procedure 500 to generate the respective query vectors 644 and the new query vector 642 by executing a word embedding algorithm, and compute the respective similarity parameters 646 between the new query 602 and the one or more past queries 634 based on the given query vector 642 and the respective query vectors 644 by executing the second similarity parameter generation procedure 550.

The method 700 then advances to step 712.

Step 712: Retrieving for at Least One Past Query of the Set of Past Queries, a Respective Value of the Given Feature for the at Least One Document At step 712, the search engine server 120 selects at least one past query based on the respective similarity parameters 650 to be part of the selected pass queries 648. In some embodiments of the present technology, the selected past queries 648 may be selected based on their respective similarity parameters 650 being above a predetermined threshold. Additionally or alternatively, the search engine server 120 may select the selected past queries 648 based on the respective similarity parameters 650 being above all other respective similarity parameters 646. A number of past queries in the selected past queries 648 may be predetermined, or may include a single past query.

At step 710, the search engine server 120 retrieves respective values 652 of the given feature 624 for the selected document 614 with respect to the selected past queries 648.

The method 700 then advances to step 714.

Step 714: Generating the Respective Value of the Given Feature for the at Least One Document Based at Least in Part on:
the respective similarity parameter of at least one past query of the set of past queries, and
the respective value for the given feature of the at least one past query of the set of past queries.

The MLA 126 then generates the value of the given feature 624 for the selected document 614 in response to the new query 602 based on: the respective similarity parameters 650 and the respective values 652 of the given feature 624 for the selected document 614.

The method 700 then advances to step 716.

Step 716: Ranking the Set of Documents to Obtain Ranked List of Documents, the Ranking being Based on the Plurality of Features, the at Least One Given Document being Ranked Based at Least in Part on the Respective Value of the Given Feature At step 716, the first MLA 220 then ranks the set of current documents 610 based on the first plurality of features 622, where the selected document 614 is ranked at least in part based on the value of the given feature 624 which was generated based the respective similarity parameters 650 and the respective values 652 of the given feature 624, to obtain final ranked list of documents 662.

The method 700 then advances to step 718.

Step 718: Transmitting, to the Electronic Device, the Ranked List of Documents to be Presented as a SERP.

At step 718, search engine server 120 then generates a SERP 664 including the final ranked list of documents 662, and transmits the SERP 664 to the first client device 104.

The method 700 then ends.

It should be apparent to those skilled in the art that at least some embodiments of the present technology aim to expand a range of technical solutions for addressing a particular technical problem, namely improving ranking of a set of search results in response to a given query by generating a value for a given feature for at least one document having no respective value for the given feature. The value for the given feature of the at least one document with respect to the given query may be generated based on similar queries having been used to present the at least one document as a search result, which may allow improving ranking of the at least one document in the set of search results. Such technical solutions may allow saving resources such as storage space, bandwidth and time on client devices, as well as on the search engine server.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Some of these steps and signal sending-receiving are well known in the art and, as such, have been omitted in certain portions of this description for the sake of simplicity. The signals can be sent-received using optical means (such as a fibre-optic connection), electronic means (such as using wired or wireless connection), and mechanical means (such as pressure-based, temperature based or any other suitable physical parameter based).

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A computer-implemented method for ranking at least one document in response to a given query using a machine learning algorithm (MLA) executed by a server, the method executable by the server, the server being connected to a search log database, the server being connected to an electronic device over a communication network, the method comprising:
receiving, by the server, the given query;
generating, by the server, a set of documents relevant to the given query, the set of documents having a plurality of features;
selecting, by the server, the at least one document from the set of documents, the at least one document having no respective value for a given feature of the plurality of features;
retrieving, from the search log database, a set of past queries having been submitted on the server, each past query of the set of past queries having presented the at least one document as a respective search result in a respective search engine results page (SERP);
retrieving, from the search log database, for each respective past query, a respective value of the given feature for the at least one document;
retrieving, from the search log database, a respective set of past documents for each respective past query of the set of past queries, the respective set of past documents having been presented as respective search results in response to the respective past query;
determining, by the server, a respective similarity parameter between the given query and each respective past query of the set of past queries, the determining the respective similarity parameter between the given query and each respective past query of the set of past queries being based on a degree of an overlap between:
the set of documents relevant to the given query, and
the respective set of documents of the respective past query;
generating, by the server, the respective value of the given feature for the at least one document based at least in part on:
the respective similarity parameter of at least one past query of the set of past queries, and
the respective value for the given feature of the at least one past query of the set of past queries;
ranking, by the MLA, the set of documents to obtain ranked list of documents, the ranking being based on the plurality of features, the at least one given document being ranked based at least in part on the respective value of the given feature; and transmitting, to the electronic device, the ranked list of documents to be presented as a SERP.

2. The method of claim 1, wherein
each respective document of the set of documents relevant to the given query has a respective annotation, the respective annotation including:
  at least one respective past search query having been used to access the respective document on the search engine server; and wherein
the retrieving the set of past queries is based on the respective annotation of the at least one document.

3. The method of claim 1, wherein
at least a subset of the set of documents is associated with respective user interaction parameters; and wherein
each respective document of the respective set of past documents for each respective query is associated with respective past user interaction parameters; and
wherein
the determining the respective similarity parameter is further based on:
  the respective user interaction parameters of the respective query of the subset of documents, and
  the respective user interaction parameters of the respective set of past documents.

4. The method of claim 1, wherein the method further comprises, prior to the generating the respective value of the given feature:
selecting, by the server, the at least one respective past query based on the respective similarity parameter being above a predetermined threshold.

5. The method of claim 1, wherein
the retrieving the respective value of the given feature of the at least one document for each respective past query further comprises:
  retrieving a respective relevance score of the at least one document to the respective past query; and wherein
  the generating the respective value of the given feature is further based on the respective relevance score.

6. The method of claim 5, wherein the generating the respective value of the given feature for the at least one document is further based on:
  a respective value of at least one other feature of the plurality of features for the given document.

7. The method of claim 6, wherein the given feature is one of:
  a query-dependent feature, and
  a user interaction parameter.

8. A system for ranking at least one document in response to a given query using a machine learning algorithm (MLA) executed by the system, the system being connected to a search log database, the system being connected to an electronic device, the system comprising:
  a processor;
  a non-transitory computer-readable medium comprising instructions;
  the processor, upon executing the instructions, being configured to:
    receive the given query;
    generate a set of documents relevant to the given query, the set of documents having a plurality of features;
    select the at least one document from the set of documents, the at least one document having no respective value for a given feature of the plurality of features;
    retrieve, from the search log database, a set of past queries having been submitted on the server, each past query of the set of past queries having presented the at least one document as a respective search result in a respective search engine results page (SERP);
    retrieve, from the search log database, for each respective past query, a respective value of the given feature for the at least one document;
    retrieve, from the search log database, a respective set of past documents for each respective past query of the set of past queries, the respective set of past documents having been presented as respective search results in response to the respective past query;
    determine a respective similarity parameter between the given query and each respective past query of the set of past queries, the determining the respective similarity parameter between the given query and each respective past query of the set of past queries is based on a degree of an overlap between:
      the set of documents relevant to the given query, and
      the respective set of documents of the respective past query;
    generate the respective value of the given feature for the at least one document based at least in part on:
      the respective similarity parameter of at least one past query of the set of past queries, and
      the respective value for the given feature of the at least one past query of the set of past queries;
    rank, via the MLA, the set of documents to obtain ranked list of documents, the ranking being based on the plurality of features, the at least one given document being ranked based at least in part on the respective value of the given feature; and
    transmit, to the electronic device, the ranked list of documents to be presented as a SERP.

9. The system of claim 8, wherein
each respective document of the set of documents relevant to the given query has a respective annotation, the respective annotation including:
  at least one respective past search query having been used to access the respective document on the search engine server; and
wherein the retrieving the set of past queries is based on the respective annotation of the at least one document.

10. The system of claim 8, wherein
at least a subset of the set of documents is associated with respective user interaction parameters; and wherein
each respective document of the respective set of past documents for each respective query is associated with respective past user interaction parameters; and
wherein
the determining the respective similarity parameter is further based on:
  the respective user interaction parameters of the respective query of the subset of documents, and
  the respective user interaction parameters of the respective set of past documents.

11. The system of claim 8, wherein the processor is further configured to, prior to the generating the respective value of the given feature:
select the at least one respective past query based on the respective similarity parameter being above a predetermined threshold.

12. The system of claim 8, wherein
to retrieve the respective value of the given feature of the at least one document for each respective past query, the processor is further configured to:

retrieve a respective relevance score of the at least one document to the respective past query; and wherein the generating the respective value of the given feature is further based on the respective relevance score.

13. The system of claim 12, wherein the generating the respective value of the given feature for the at least one document is further based on:
a respective value of at least one other feature of the plurality of features for the given document.

14. The system of claim 13, wherein the given feature is one of:
a query-dependent feature, and
a user interaction parameter.

* * * * *